(12) United States Patent
Hotchkies et al.

(10) Patent No.: US 9,424,357 B1
(45) Date of Patent: Aug. 23, 2016

(54) PREDICTIVE PAGE LOADING BASED ON TEXT ENTRY AND SEARCH TERM SUGGESTIONS

(75) Inventors: Blair L. Hotchkies, Bellevue, WA (US); Michael L. Brundage, Kirkland, WA (US); Pongsakorn Teeraparpwong, Bellevue, WA (US); Jason P. Patrikios, Seattle, WA (US); Sarah E. Williams, Seattle, WA (US); Brent Robert Mills, Seattle, WA (US); Alexandru I. Indrei, Seattle, WA (US); Daniel R. Parshall, Redmond, WA (US); John M. Nilles, Poulsbo, WA (US); Sikandar Saifullah, Issaquah, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 114 days.

(21) Appl. No.: 13/037,842

(22) Filed: Mar. 1, 2011

(51) Int. Cl.
*G06F 17/30* (2006.01)

(52) U.S. Cl.
CPC .... *G06F 17/30867* (2013.01); *G06F 17/30902* (2013.01)

(58) Field of Classification Search
None
See application file for complete search history.

(56) References Cited

U.S. PATENT DOCUMENTS

| | | | |
|---|---|---|---|
| 5,873,076 A * | 2/1999 | Barr et al. | 704/270.1 |
| 6,023,726 A | 2/2000 | Saksena | |
| 6,029,195 A | 2/2000 | Herz | |
| 6,085,226 A | 7/2000 | Horvitz | |
| 6,182,133 B1 | 1/2001 | Horvitz | |
| 6,237,039 B1 | 5/2001 | Perlman | |
| 7,010,537 B2 * | 3/2006 | Eyal et al. | |
| 7,415,517 B1 | 8/2008 | Schleit et al. | |
| 7,475,089 B1 | 1/2009 | Geddes | |
| 7,499,940 B1 * | 3/2009 | Gibbs | |
| 7,617,202 B2 * | 11/2009 | Brill et al. | |
| 7,716,332 B1 | 5/2010 | Topfl et al. | |
| 7,725,501 B1 | 5/2010 | Stillman et al. | |
| 7,747,749 B1 | 6/2010 | Erikson et al. | |
| 7,757,298 B2 | 7/2010 | Shuster | |
| 7,836,044 B2 * | 11/2010 | Kamvar et al. | 707/713 |
| 7,890,526 B1 | 2/2011 | Brewer et al. | |
| 8,112,409 B2 | 2/2012 | Shen et al. | |
| 8,230,046 B2 | 7/2012 | Jiang | |
| 8,239,046 B2 | 8/2012 | Koehler et al. | |
| 8,316,019 B1 | 11/2012 | Ainslie et al. | |
| 8,676,828 B1 * | 3/2014 | Agarwal et al. | 707/767 |

(Continued)

OTHER PUBLICATIONS

Search Results—IP.com, retrieved from https://ip.com/search/results.html, Mar. 19, 2014.

(Continued)

*Primary Examiner* — Charles Adams
(74) *Attorney, Agent, or Firm* — Thomas | Horstemeyer, LLP

(57) ABSTRACT

Disclosed are various embodiments for predictive page loading. Text entered by a user into a search query form is captured. If an evaluation of the size of the captured text or identity of characters in the captured text in accordance with a confidence criteria indicates that the confidence criteria is met, a speculative search query is provided to a server. The speculative search query includes a selected suggested search term. A received plurality of speculative search results is rendered in a hidden portion of a browser window. In response to receiving a user instruction to execute a committed search query that includes the at least one selected suggested search term, at least a portion of the received plurality of speculative search results is rendered in a visible portion of the browser window.

20 Claims, 11 Drawing Sheets

(56) References Cited

U.S. PATENT DOCUMENTS

| | | | |
|---|---|---|---|
| 2002/0010634 A1 | 1/2002 | Roman | |
| 2002/0010663 A1 | 1/2002 | Muller | |
| 2002/0023084 A1* | 2/2002 | Eyal et al. | 707/3 |
| 2002/0042923 A1 | 4/2002 | Asmussen et al. | |
| 2003/0195877 A1 | 10/2003 | Ford et al. | |
| 2003/0233245 A1 | 12/2003 | Zemore | |
| 2003/0233246 A1 | 12/2003 | Snapp | |
| 2004/0133564 A1 | 7/2004 | Gross et al. | |
| 2005/0149576 A1 | 7/2005 | Marmaros et al. | |
| 2005/0228795 A1 | 10/2005 | Shuster | |
| 2005/0258046 A1 | 11/2005 | Basol | |
| 2005/0268046 A1 | 12/2005 | Heil | |
| 2006/0047775 A1 | 3/2006 | Bruck et al. | |
| 2006/0047804 A1 | 3/2006 | Fredricksen et al. | |
| 2006/0070012 A1 | 3/2006 | Milener et al. | |
| 2006/0080292 A1* | 4/2006 | Alanzi | 707/3 |
| 2006/0206454 A1 | 9/2006 | Forstall et al. | |
| 2007/0050339 A1* | 3/2007 | Kasperski et al. | 707/3 |
| 2007/0088681 A1* | 4/2007 | Aravamudan et al. | 707/3 |
| 2007/0124446 A1 | 5/2007 | Coulthard et al. | |
| 2007/0255619 A1 | 11/2007 | Ekchian | |
| 2007/0260703 A1 | 11/2007 | Ardhanari et al. | |
| 2008/0016218 A1 | 1/2008 | Jones et al. | |
| 2008/0235594 A1* | 9/2008 | Bhumkar et al. | 715/738 |
| 2008/0295021 A1 | 11/2008 | Nguyen et al. | |
| 2009/0024971 A1 | 1/2009 | Willner et al. | |
| 2009/0094221 A1* | 4/2009 | Cameron | G06F 17/3064 |
| 2009/0210448 A1 | 8/2009 | Carlson | |
| 2009/0228811 A1 | 9/2009 | Adams et al. | |
| 2009/0281871 A1 | 11/2009 | Tietzen et al. | |
| 2010/0057687 A1 | 3/2010 | Shen et al. | |
| 2010/0088398 A1 | 4/2010 | Plamondon | |
| 2010/0089899 A1 | 4/2010 | Dohring et al. | |
| 2010/0153427 A1 | 6/2010 | Schechter et al. | |
| 2010/0162126 A1 | 6/2010 | Donaldson et al. | |
| 2010/0169137 A1 | 7/2010 | Jastrebski | |
| 2011/0040777 A1 | 2/2011 | Stefanov | |
| 2011/0145321 A1 | 6/2011 | Jiang | |
| 2012/0089899 A1 | 4/2012 | Palaima et al. | |

OTHER PUBLICATIONS

Final OA mailed on Dec. 26, 2014 in related pending U.S. Appl. No. 13/037,852.

Final OA mailed on Dec. 12, 2014 in related pending U.S. Appl. No. 13/037,857.

Non-final OA mailed on Oct. 25, 2013 in related pending U.S. Appl. No. 13/037,837.

Non-Final Office Action in related pending U.S. Appl. No. 13/037,837.

Derkeiler.com "Refund Dilema—Opinions needed", http://newsgroup.derkeiler.com/Archive/Alt/alt.marketing.online.edu.ebay/2005-10/msg02945.html, Oct. 22, 2005.

Jennings, T., & Baker, A Application Express Application Builder User's Guide (Sep. 2010),. Retrieved May 14, 2014 from http://docs.oracle.com/cd/E17556_01/welcome.html. (Uploaded to PTO as Part 1 and Part 2).

Roadracing World Publishing "Yamaha Offers to Buy Back YZF-R6 Streetbikes Over Redline Claims", Feb. 14, 2006, Roadracing World Publishing, Inc., http://roadracingworld.com/news/article/?=25009.

* cited by examiner

PREDICTIVE PAGE LOADING BASED ON TEXT ENTRY AND SEARCH TERM SUGGESTIONS

BACKGROUND

Online shoppers interact with product search engines to find products of interest and obtain information about those products. As a user enters search terms into a search form, data from past searches may be used to display suggested search terms or search phrases to the user. A user can complete the search query more quickly by accepting one of the search term suggestions.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The various embodiments described herein relate to search term suggestions provided by a suggestion engine to a browser client. A prediction is made about which search term suggestion(s) is likely to be accepted by a user, based on the number of characters entered by the user into the search query form. A speculative query is formed using the predicted search term suggestion, and results of the speculative query are downloaded to the browser before the user executes a query. These pre-fetched speculative results are rendered in a hidden portion of the browser window. When the user commits to a search query using the predicted search term suggestion, the pre-fetched results are made visible while the browser downloads the remainder of the speculative search results.

Figure 1:
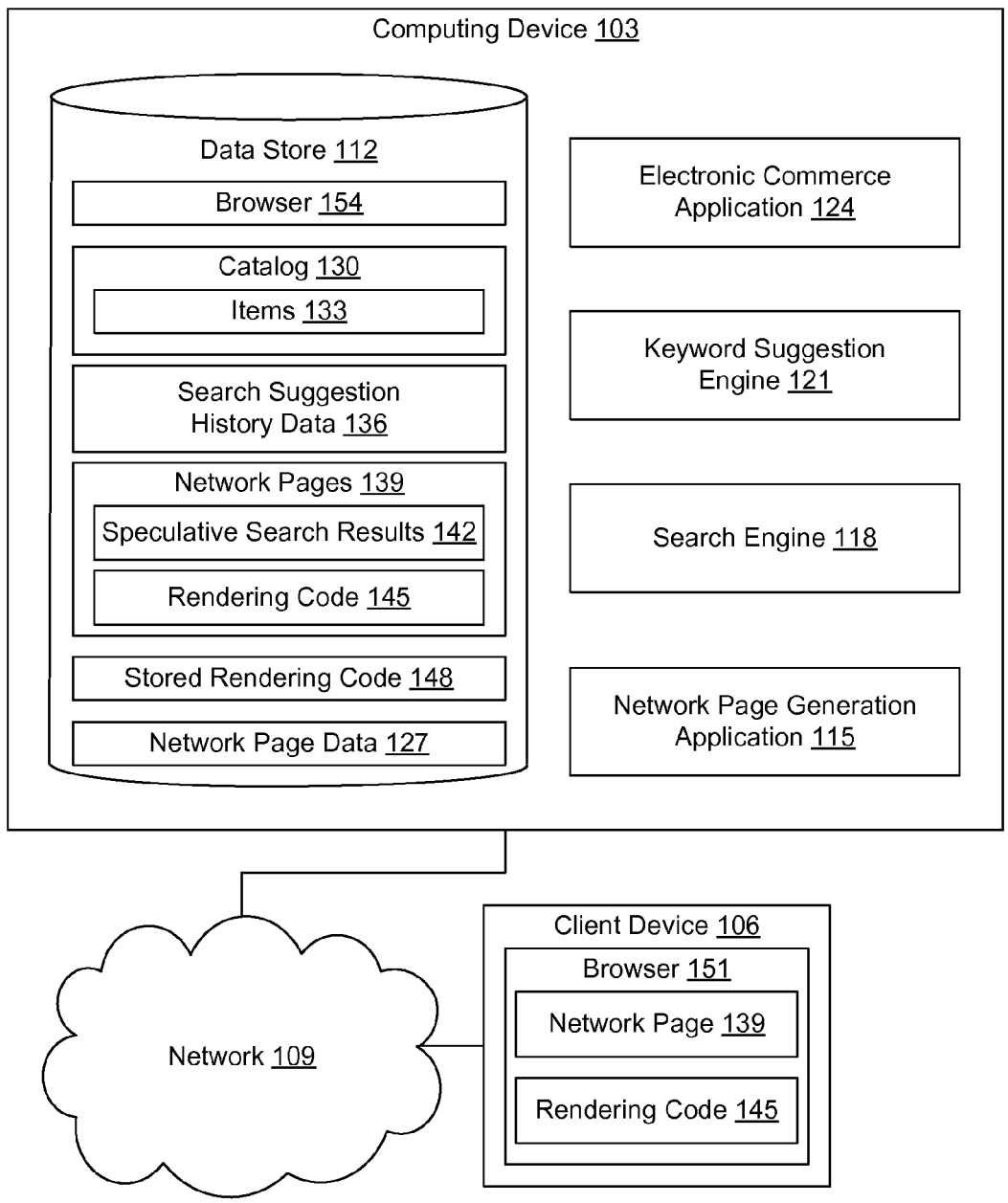
FIG. 1 is a drawing of a networked environment according to one embodiment of the present disclosure.

With reference to FIG. 1, shown is a networked environment 100 according to various embodiments. The networked environment 100 includes one or more computing devices 103 in data communication with one or more client devices 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in various arrangements.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below.

The components executed on the computing device 103 include, for example, a network page generation application 115, a search engine 118, and a search term suggestion engine 121. In some embodiments, the computing device 103 also includes an electronic commerce application 124. The components executed on the computing device 103 may also include other applications, services, processes, systems, engines, or functionality not discussed in detail herein. These components may communicate with each other using various mechanisms, including but not limited to any type of middleware framework. Though shown as logically separate components, the functionality of the network page generation application 115, the search term suggestion engine 121, and the search engine 118 can be combined and/or distributed in various ways, as can be appreciated.

The data stored in the data store 112 includes, for example, network page data 127, rendering code 145, a catalog 130 of items 133, search suggestion history data 136, and potentially other data. As used herein, the term "item" 133 may refer to a product, good, service, software download, multimedia download, social networking profile, or other item 133 that may be offered for sale, purchase, rental, lease, download, and/or any other form of consumption, as may be appreciated. Associated with items 133 and stored in catalog 130 are data such as titles, descriptions, keywords, metadata, weights, customer reviews, multimedia, and other data relating to the items 133.

The optional electronic commerce application 124, if present, is executed in order to facilitate the online viewing and/or purchase of items and products over the network 109. The electronic commerce application 124 also performs various backend functions associated with the online presence of a merchant in order to facilitate the online purchase of items, as should be appreciated. In embodiments which include the electronic commerce application 124, the catalog of items comprises a product catalog of items offered for sale, so that data associated with items 133 comprises product data.

The search engine 118 is executed to find items 133 in the catalog 130 using a search query. To provide content in response to user queries, content associated with item(s) retrieved by a query may be retrieved from the catalog data and encoded for display in a client device 106 by the network page generation application 115.

The search term suggestion engine 121 is executed to provide suggested search terms as a user enters text into a search query form. The search term suggestion engine 121 selects one or more search terms that a user is likely to be interested in using search suggestion history data 136 stored in the data store 112. The search suggestion history data 136 may be derived, for example, from historical user data collected by a search profiling service or another application based on previous search queries, page view data, and/or other data. The search suggestion history data 136 may be indexed for a particular user, or may be aggregated across users. In some embodiments, search terms can be suggested to a user based upon matching various aspects of a profile of a user with specific items in the catalog 130. In some embodiments, search terms can be suggested based on the popularity of certain search terms among other users or other factors as can be appreciated. In some embodiments, when used in conjunction with an electronic commerce application 124, search terms can also be suggested to the user based upon the shopping history or preferences of the user, or the popularity of particular items in the catalog 130. The search term suggestion engine 121 provides the one or more suggested search terms to the client device 106, where the search terms may be presented to the user and/or used to issue a speculative search query as described in further detail below.

The network page generation application 115 is executed to generate network pages 139 that describe items 133 located through a search or by browsing the catalog 130. To this end, the network page generation application 115 uses network page data 127, which may include any type of data related to the generation of network pages 139. Such data may include, for example, templates, executable code, interpreted code, hypertext markup language (HTML), extensible markup language (XML), images, video, text, graphics, and any other type of data that may be used in network pages 139.

The network page generation application 115 may include a network page server and/or other components. The network page server may comprise a commercially available hypertext transfer protocol (HTTP) server such as, for example, Apache® HTTP Server, Microsoft® Internet Information Services (IIS), and other servers.

As described in further detail below, the network page generation application 115 may also add results from a speculative search query to a network page 139. Thus, the network page 139 may include speculative search results 142 and rendering code 145 as well as other content. The combination of the speculative search results 142 and the rendering code 145 stored on a network page 139 allows the client device 106 to pre-load and to render more quickly search results from a query that a user is expected to perform, based on search terms provided by the search term suggestion engine 121. In some embodiments, the speculative search results 142 correspond to the portion of the search results network page 139 that is first seen by the user, a region sometimes referred to as "above the fold."

The network page generation application 115 may be configured to generate the rendering code 145 for a specific network page 139 and/or client device 106 based on stored rendering code 148 in the data store 112. The specific rendering code 145 and the stored rendering code 148 may include, for example, Javascript, dynamic HTML (DHTML), Ajax, and any other type of code that may be executed in a client device 106 from within a network page 139. The specific rendering code 145 and the stored rendering code 148 may also include asynchronous exchange of data with the network page generation application 115, the search term suggestion engine 121, the search engine 118, or other applications using Ajax, simple object access protocol (SOAP), remote procedure call (RPC), and/or other technologies.

Having discussed the computing device 103, the client device 106 will now be considered. The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a set-top box, a music player, a video player, a media player, a web pad, a tablet computer system, a game console, an electronic book reader, or other devices with like capability.

The client device 106 may be configured to execute various applications such as a browser 151 and other applications. The browser 151 may be executed in a client device 106, for example, to access and render network pages 139 or other network content served up by the network page generation application 115, thereby generating a rendered network page. The client device 106 may be configured to execute applications beyond the browser 151 such as, for example, email applications, instant message applications, and/or other applications.

Figure 2:
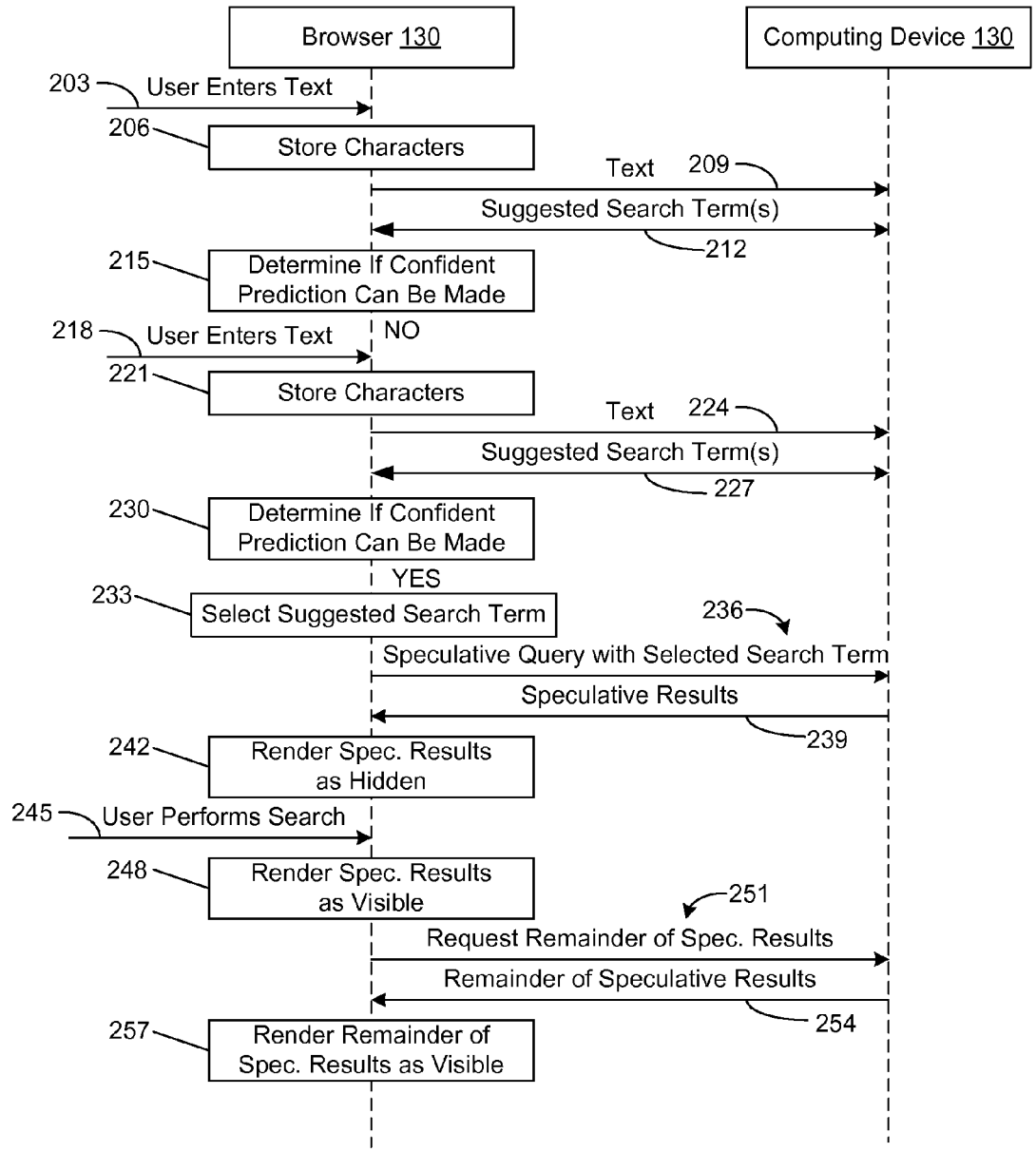
FIG. 2 is a block diagram illustrating various interactions between some of the components in the networked environment of FIG. 1 according to various embodiments of the present disclosure.

Turning to FIG. 2, a general description of the operation of the various components of the networked environment 100 is provided. To begin, at event 203 a user at a client device 106 interacts with the browser 151 by entering text into a search query form. At block 206, the browser 151 stores characters as the user enters text into the form. At some point after one or more characters are entered, at event 209 the browser 151 forwards the text to the computing device 103 over the network 109 (FIG. 1), where the text is processed by the search term suggestion engine 121. At event 212, the computing device 103 provides a list of one or more suggested search terms to the browser 151.

At block 215, the browser 151 determines if the characters entered so far provide enough information to confidently predict which suggested search term the user will select to form the search query. This determination is made by analyzing characteristics of the text entered so far and comparing those characteristics to one or more text criteria, as described in more detail below. In other embodiments (not shown) the determination as to whether a prediction is confident may occur on the computing device 103 rather than on the client device 106. In the particular example scenario of FIG. 2, it is assumed that the characteristics of the entered text do not meet the criteria, so more text will be processed before predicting a search query.

To this end, at event 218 continues to enter characters into the search query form, and the new characters are stored by the browser 151 at block 221. The browser 151 forwards the new characters to the computing device 103 at event 224. Alternatively, the browser 151 may forward all text entered so far. The computing device 103 uses the new information to provide to the browser 151 at event 227 a new list of suggested search terms. Alternatively, an updated list of new and previously provided search terms can be provided. As used herein, "search term" is not limited to a single word, but covers compounds and phrases. Thus, "harry" is considered a search term, as is "harry potter." Thus, the number of terms is not always the same as the number of words. For example, a list of suggested search terms for block 227 might include three separate search terms: "harry connick," and "harry potter."

At block 230, the browser 151 uses the text size information to determine if the characters entered so far provide enough information to confidently predict which suggested search term the user will select to form the search query. In the particular example scenario of FIG. 2, it is assumed that the text entered at this point does meet the confidence criteria.

At block 233, the browser 151 selects the first suggested search term provided by the computing device 103. The browser 151 forms a search query using the predicted search term, and issues the search query to the computing device 103 at event 236. The first suggested search term can thus be considered a predicted search term, and the search query can be considered a speculative search query. Other embodiments support multiple predicted search terms by selecting the first N suggested search terms are selected, where N>1. Embodiments which support multiple predicted search terms may use one query per search term, or may bundle more than one search term into a single query.

At block 239, the computing device 103 obtains results for the speculative search query and generates a network page 139 which includes the speculative search results as well as rendering code 145. The speculative search results may be a complete list of search results, or may be only a partial list. At block 242, the network page 139 is processed and rendered by the browser 151. During this processing, the rendering code 145 on the network page 139 executes on the client device 106 to render the speculative search results in a hidden portion of the browser 151. The browser 151 has thus pre-loaded at least a first portion of search results for a speculative query.

At event 245, the user performs the search using the predicted search term. In this manner, one of the once-speculative queries becomes a confirmed query. In this example scenario, the speculative search results are only partial results, so at block 251, the rendering code 145 requests the remaining portion of the search results for the speculative query from the network page generation application 115. Next, at block 248 the rendering code 145 executes to make the pre-loaded hidden speculative search results 142 visible in the browser 151. While block 251 (download remainder) is shown before block 248 (partial render), the order can also be reversed, or the two actions can run substantially concurrently.

At event 254, the remainder of the search results network page 139 is downloaded, and at block 257 the rendering code 145 renders an updated view of the network page 139 so that the remainder of the search results are visible. In some embodiments, the updated view makes the entire new network page 139 visible. In other embodiments, the updated view includes an element such as a viewport, scroll bar, etc., which allows the user to take action to make the remainder visible.

In this manner, the user experience is enhanced by making a prediction about which search queries the user will perform and speculative issuing those queries, since the pre-fetched results can be rendered when the user commits to the query. Without this prediction, the download of the search results page would be delayed until the user committed to the query. As described above, the user does not see the speculative search results until user action results in issuance of a committed query containing one of the search term suggestions. The browser embodiment described in connection with FIG. 2 accomplished this by rendering the speculative search results in a hidden portion of the browser window. Other browser embodiments accomplish this by locally storing the speculative search results when they are returned from the computing device 103, but delaying the display of the speculative search results until a user action causes the committed query to be issued.

In some embodiments, the prediction mechanism describe above is used repeatedly. To this end, when returning the remainder of the once-speculative but now-committed search results to the browser 154, the page generation application 115 may also include a portion of another set of speculative search results. The page generation application 115 may decide on a page-by-page basis whether to include additional speculative results along with the remainder data for the last set of speculative results. In some embodiments, the browser does not specifically encode a request for the remainder, but may instead generically encode a request for another network page. In this case, the network page generation application 115 uses stored context to determine that the requested page should include another set of speculative results. The operation of the rendering code 145 will now be described in the context of examples of network pages 139 that are rendered in a browser 151.

FIGS. 3A-E illustrate examples of a network page 139, denoted herein as 139a, 139b, 139c, 139d, and 139e, rendered by a browser 151 executing in client device 106 in the networked environment 100. As noted above, the network page 139 is a search result page that is generated by the network page generation application 115. FIGS. 3A-E illustrate various stages of predicting, issuing, and rendering a search query of "tee shirts."

Figure 3A:
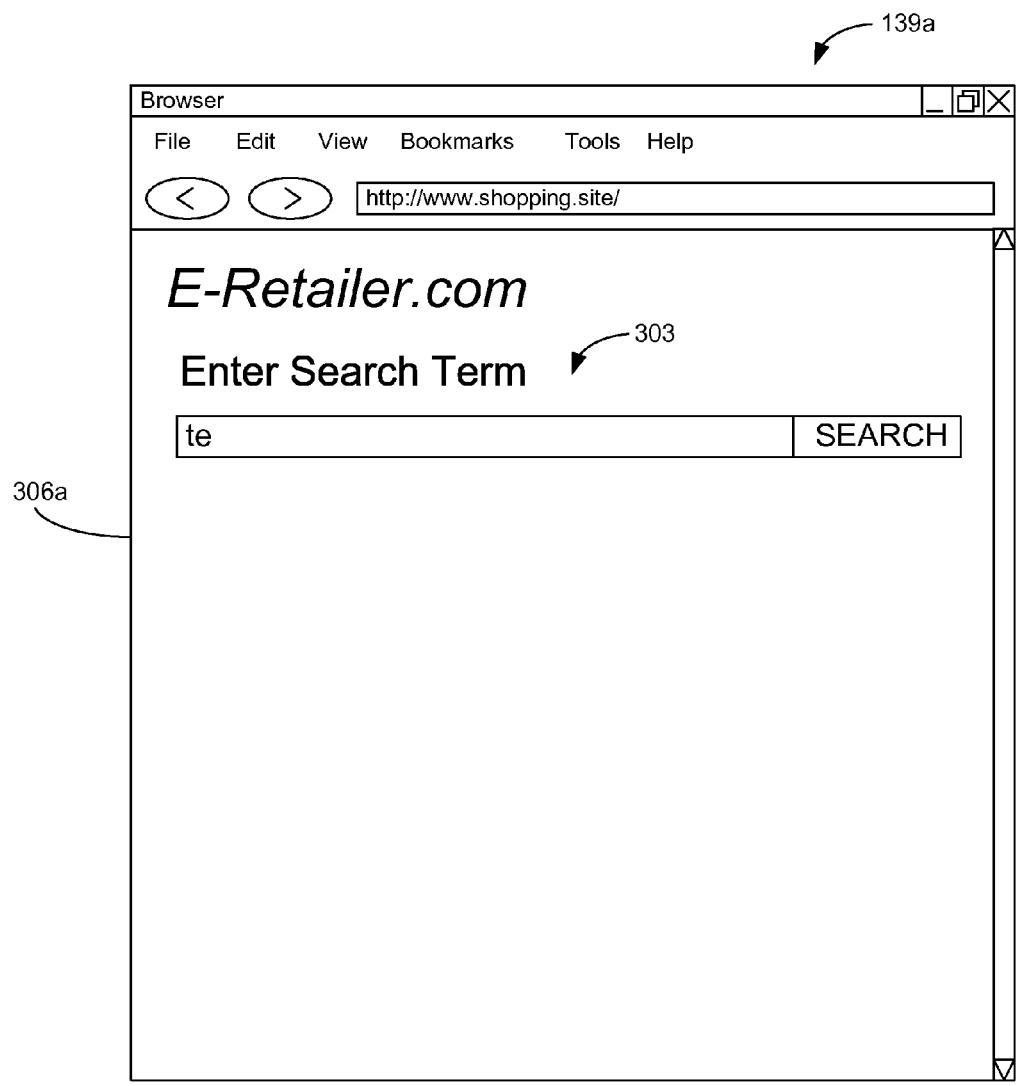
FIGS. 3A-E are drawings of examples of a network page rendered by a client device in the networked environment of FIG. 1 according to various embodiments of the present disclosure.

Referring to FIG. 3A, the network page 139a includes a search query component 303 in a visible portion 306a of the page. A user enters text for a search query into the search query component 303. The search query component 303 may be implemented, for example, as an HTTP form. In the example of FIG. 3A, the user has entered two keys, "t" and "e." As explained above, these keys are provided by the browser 151 to the search term suggestion engine 121 in the computing device 103, which suggests search terms based on the text entered by the user. In the example of FIG. 3A, the search term suggestion engine 121 has not yet provided suggestions, and no search query has been issued.

Figure 3B:
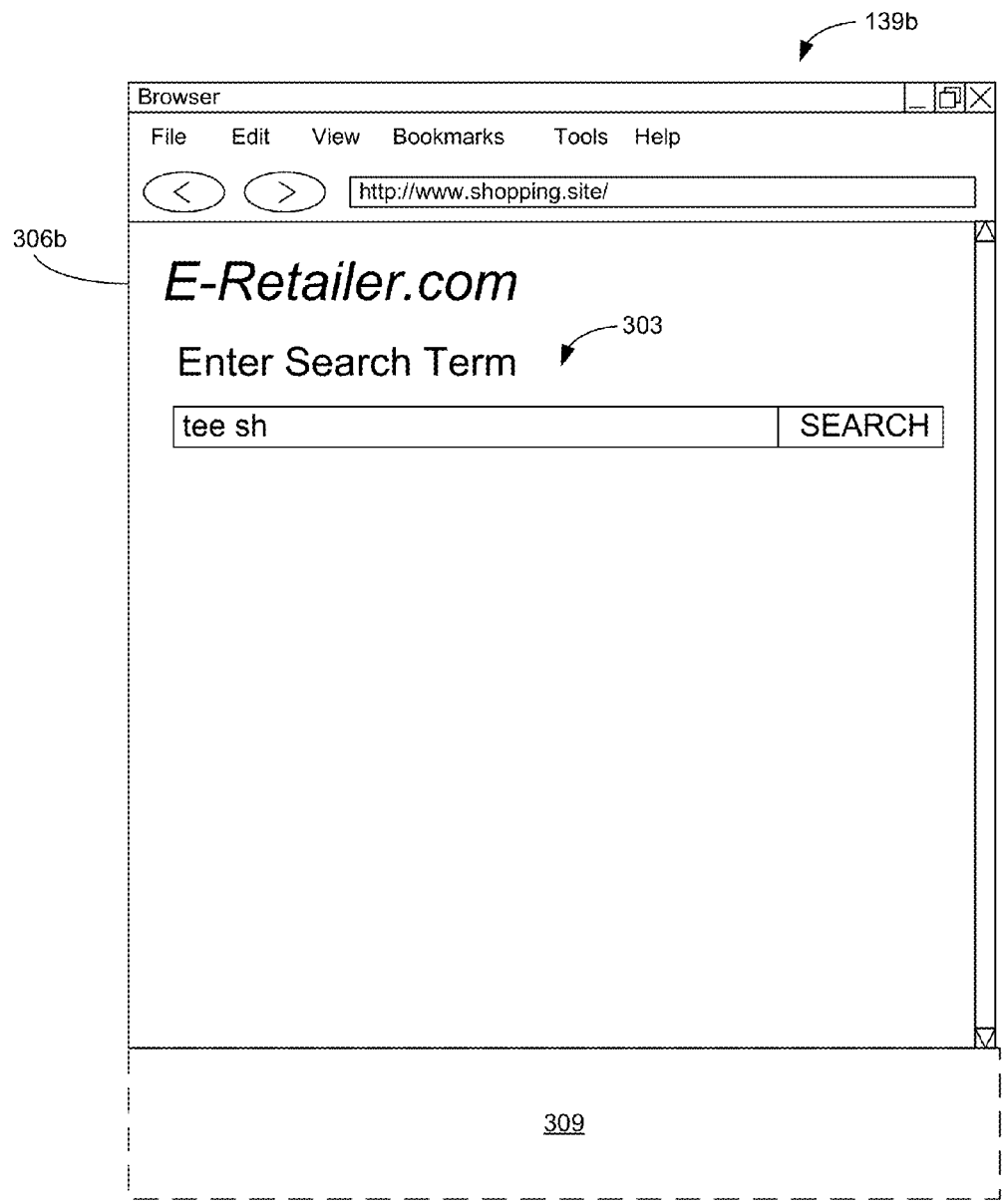

Moving on to FIG. 3B, shown is the network page 139b, which includes the search query component 303 in the visible portion 306b of the page. This network page 139b illustrates the user entering more text: "e sh." In this example, the search term suggestion engine 121 has provided a suggestion list including "tee shirt," and the browser 151 has determined that the characteristics of the entered text allows a confident prediction that the user will select the search term "tee shirt" when that suggestion is shown to the user. As a result of this confident prediction, the browser 151 has preemptively issued the speculative search query "tee shirt" and received speculative search results. In other words, the retrieval of speculative search results occurs before, and is independent of, the user action which actually requests the search. However, since the user has not yet committed to a search query, the speculative search results are stored in a hidden portion 309 of the network page 139a, which is not visible in the browser 151.

Figure 3C:
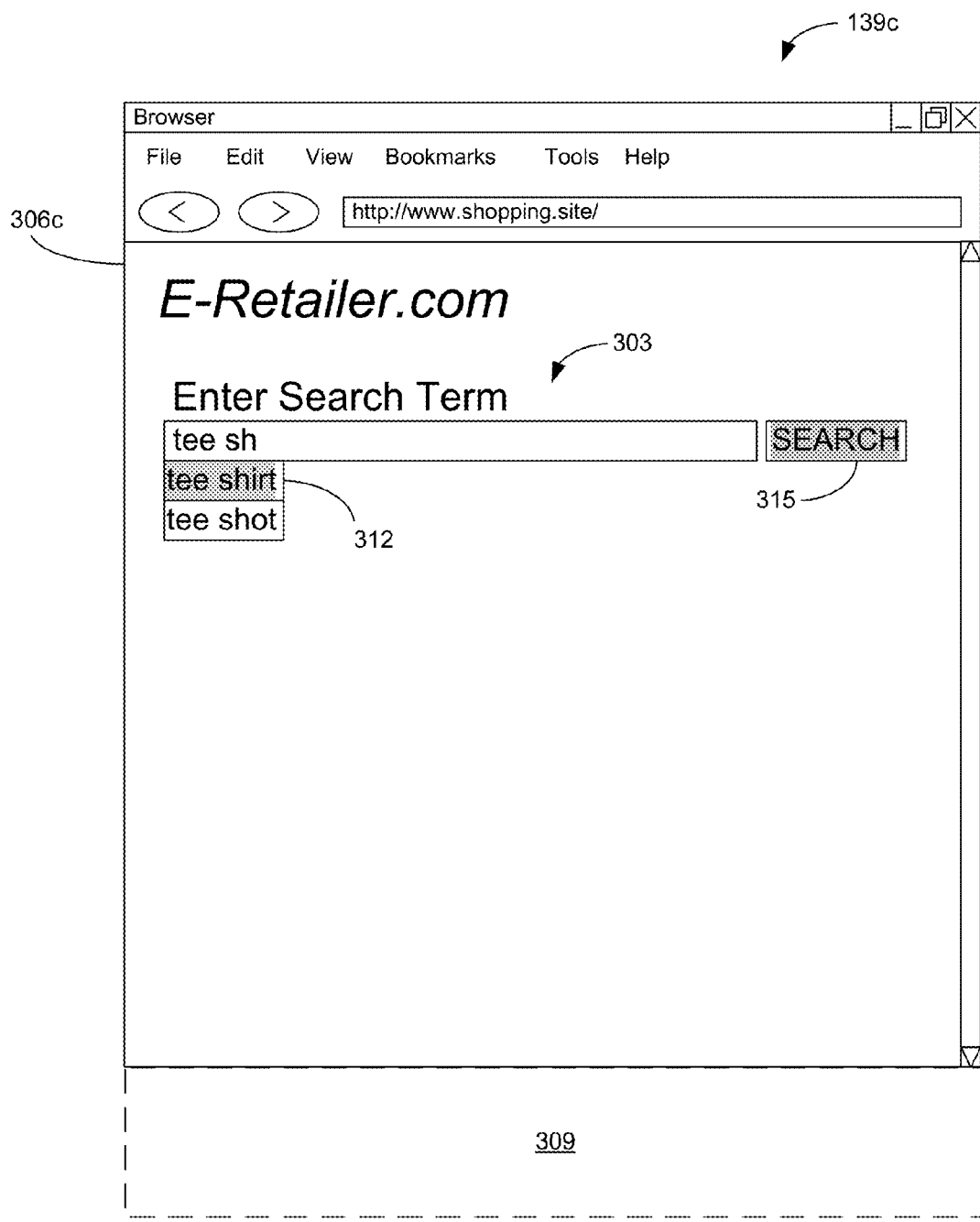

Turning now to FIG. 3C, shown is another network page 139c which includes the search query component 303 in the visible portion 306c of the page. As noted above, the search term suggestion engine 121 has already provided a suggestion list including "tee shirt." This network page 139b illustrates that this suggestion is shown to the user by means of drop-down list box 312. This network page 139b illustrates that the user has committed to the search query by selecting the "Search" button 315.

Figure 3D:

With reference now to FIG. 3D, shown is another network page 139d which is rendered in response the user committing to the speculative search. The pre-loaded speculative search results are rendered by the rendering code 145 in a list 318 in the visible portion 306d of the page. Since these three items were obtained before the user committed to the search, they are made visible without a delay while the remainder of the results from the committed search query is retrieved as described above in connection with FIG. 2. While three items were pre-loaded in this particular example, the number of pre-loaded items is a design choice, as should be appreciated.

Figure 3E:
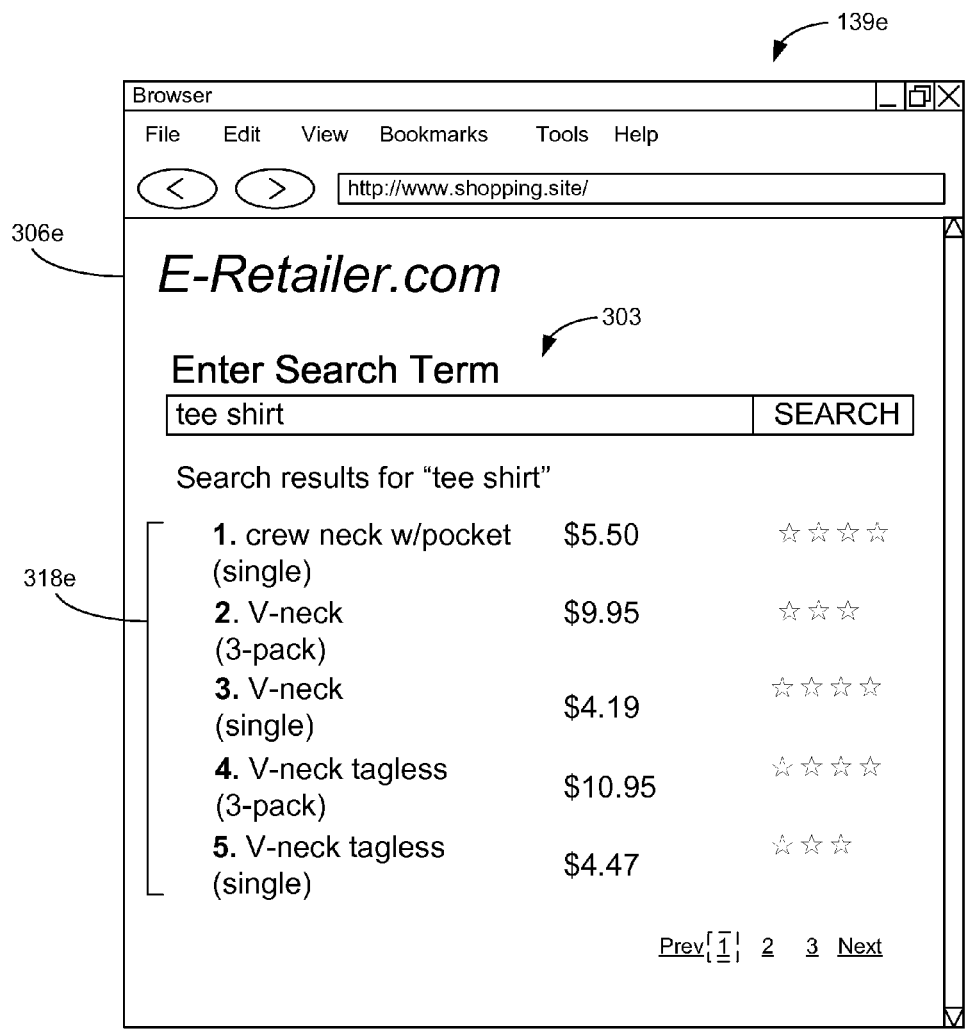

Referring now to FIG. 3E, shown is another network page 139e which is rendered by the rendering code 145 when the download of the committed search query is complete. All five items of the search results are now visible in the visible portion 306e of the page in the search results list 318e.

Figure 4A:
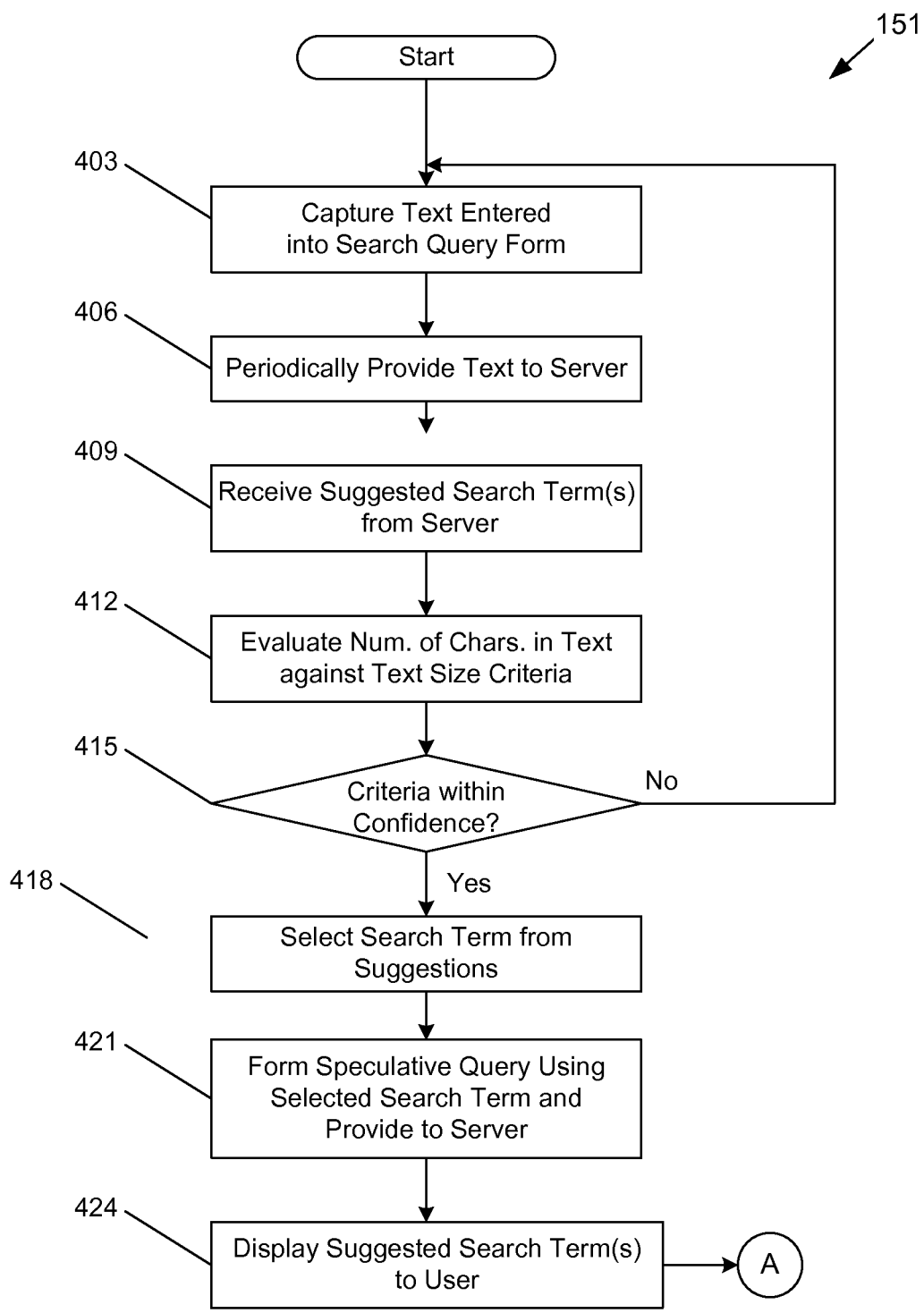
FIGS. 4A and 4B form a flowchart illustrating an example of functionality implemented as portions of a browser executed in a client computing device in the networked environment of FIG. 1 according to various embodiments of the present disclosure.
Figure 4B:
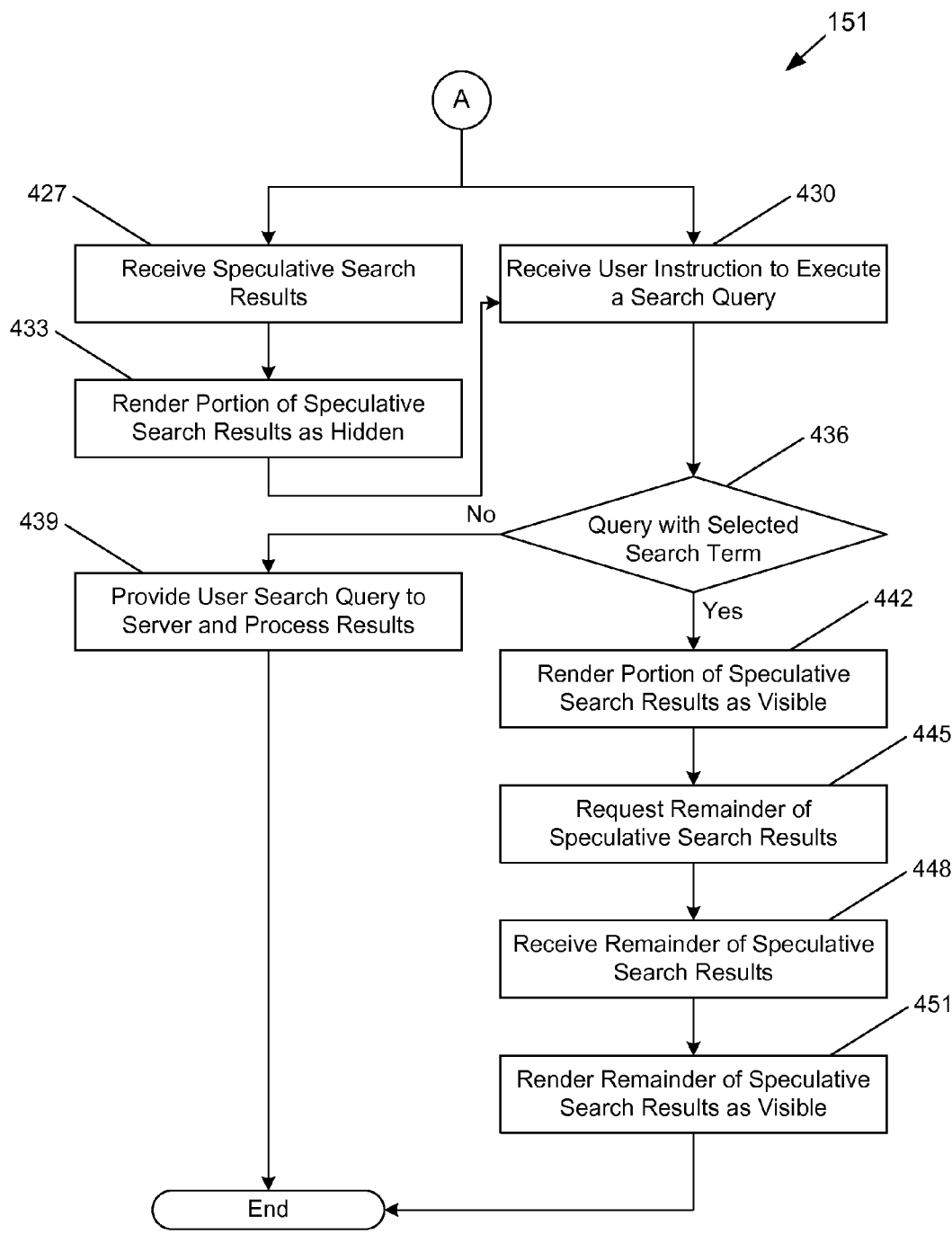

Having described the overall process of predicting search terms likely to be entered by a user into a search query and using the prediction to fetch a speculative search results network page 139 before a user commits to the search, the operation of the client side components will now be described in more detail. Turning now to FIGS. 4A and 4B, shown is a flowchart that provides one example of the operation of a portion of the browser 151 (FIG. 1) according to various embodiments. It is understood that the flowchart of FIGS. 4A and 4B provides merely an example of the many different types of functional arrangements that may be employed to implement the operation of the portion of the browser 151 as described herein. As an alternative, the flowchart of FIGS. 4A and 4B may be viewed as depicting an example of steps of a method implemented in the client device 106 (FIG. 1) according to one or more embodiments.

Beginning at box 403 in FIG. 4A, the browser 151 captures text as it is entered by a user into a search query component 303 within a search results network page 139. The browser 151 periodically provides the text to the computing device 103, for processing by the search term suggestion engine 121, at box 406. Next, at box 409 the browser 151 receives one or more suggested search terms from the computing device 103. Having received at least one suggested search term, the browser 151 determines whether a prediction can be made, with confidence, that one of the suggested search terms will be accepted by the user. Once a confident prediction is available, a speculative search query can be issued for the suggested search term, before the user actually chooses the search term and executes a search. The prediction of whether a suggested search term will be selected by the user at a particular point in time is based on the number of characters in the search query at that time, as follows.

At box 412 the browser 151 evaluates the entered text in accordance with one or more text characteristics confidence criteria. Such criteria may include, for example: number of characters in the entered text exceeds a predefined threshold; number of characters in the entered text exceeds a predefined percentage of the first search term suggested by the search term suggestion engine 121; and identity of characters within the entered text. Some embodiments may combine multiple text size criteria. In some embodiments, the predefined threshold depends on the current search category in which the user performs the search.

In some embodiments, the confidence criteria is expressed in terms of specific characters or key combinations. For example, the browser may consider the confidence criteria to be met as soon as the user enters a character indicating a word break (e.g. a space). Some characters or character sequences may be treated as confident predictors while others are not, e.g., "ip" may confidently predict "ipad" or "ipod," while "t" and "th" may not lead to confident predictions. The search term suggestion engine 121 may provide these character-specific or sequence-specific probabilities back to the browser 151. For example, if the user types "ip" the engine 121 may provide "ipad" and "ipod" as suggested search terms, along with respective probabilities that the user will choose these suggestions.

As another example, the browser 151 may consider the confidence criteria to be met when the user enters a key combination that indicates text was pasted from the clipboard (e.g., ctrl-v). The confidence criteria may also be expressed in terms of a user action (e.g., paste) rather than a specific key, since a user may paste text by using a menu instead of a key. The predefined thresholds may be configurable. In some embodiments, the predefined thresholds are empirically determined based on past user behavior data. This past user behavior data may describe the conditional probability of a user accepting suggested search terms when the text entered meets specific size conditions. For example, the past user behavior data may show that the probability of a user accepting the first search term suggestion is 35% when the user has entered only one character, 40% when the user has entered only two characters, and 50% when the user has entered eight characters. With such data, the browser 151 may use the total number of characters as a confidence parameter and the confidence criteria may be set to eight characters, to ensure a relatively high confidence level (50%) that the user will select one of the search terms suggested by the search term suggestion engine 121.

At box 415, the browser 151 compares the size of the text to the text size confidence criteria. If the text size does not meet the criteria, the browser 151 continues to monitor new text by repeating boxes 403 through 412 until a confident prediction can be made, or until a user executes a search query. If at box 415 it is determined that the text size does meet the text size confidence criteria, then processing continues at box 418, where the browser 151 selects a search term from those suggested search terms provided by the computing device 103 at box 409. In some embodiments, the first search term suggestion is selected. In other embodiments, more than one search term suggestion may be selected.

Next, at box 421 the browser 151 forms a speculative search query from the selected search term and provides the speculative search query to the computing device 103. At box 424, the selected search term is displayed to the user in the search query component 303.

The flowchart continues at box in FIG. 4B, where one of two events is processed. Box 427 is executed if the browser 151 next receives results from the speculative search query issued in box 421, while box 430 is executed if the browser 151 next receives a user instruction to execute a search query. Once the speculative search results are received at box 427, the rendering code 145 executes in the browser 151 at box 433 to render speculative search results in a hidden portion of the browser 151. In the embodiment discussed here in connection with FIGS. 4A and 4B, the speculative search results provided by the computing device 103 represent only a portion of the entire results, with the remainder being fetched later. In other embodiments, the computing device 103 provides the entire search result set at one. Having hidden the speculative search results, processing then continues at box 430.

Box 430 is executed when the browser 151 receives a user instruction to execute a search query, which may occur before or after speculative search results are received. Next, at box 436 the browser 151 determines whether the query executed by the user corresponds to the suggested search term used in the speculative search results, or to a different search term. If the user did not execute a query for the speculative search term, then at box 439 the browser 151 provides the user's search term to the computing device 103. Since the speculative search query was incorrect (a "miss") the search results are processed in a conventional manner, and the search query process of FIGS. 4A and 4B is complete.

If instead it is determined at box 436 that the query executed by the user corresponds to the suggested search term used in the speculative search results, then at box 442 the rendering code 145 re-renders the previously received first portion of the speculative results, this time in the visible portion of the browser 151. Next, at box 445 the browser 151 requests any remaining portion of the speculative search results, since the query was confirmed by the user. At box 448, the browser 151 receives the requested remainder, and at box 451 the browser 151 renders the remainder in the visible portion of the browser 151. At this point, all results for first-speculative and now-confirmed search query are visible, both the pre-loaded partial results and the just received remainder. The process of FIGS. 4A and 4B is then complete.

As described above, the user does not see the partial page content until the user action views the predicted network page 139. The browser embodiment described in connection with FIGS. 4A and 4B accomplished this by rendering the partial predicted page content in a hidden portion of the browser window. Other browser embodiments accomplish this by locally storing the partial predicted page content when it is returned from the computing device 103, but delaying the display of the partial predicted page content until a user action causes the predicted network page 136 to be accessed.

Figure 5:
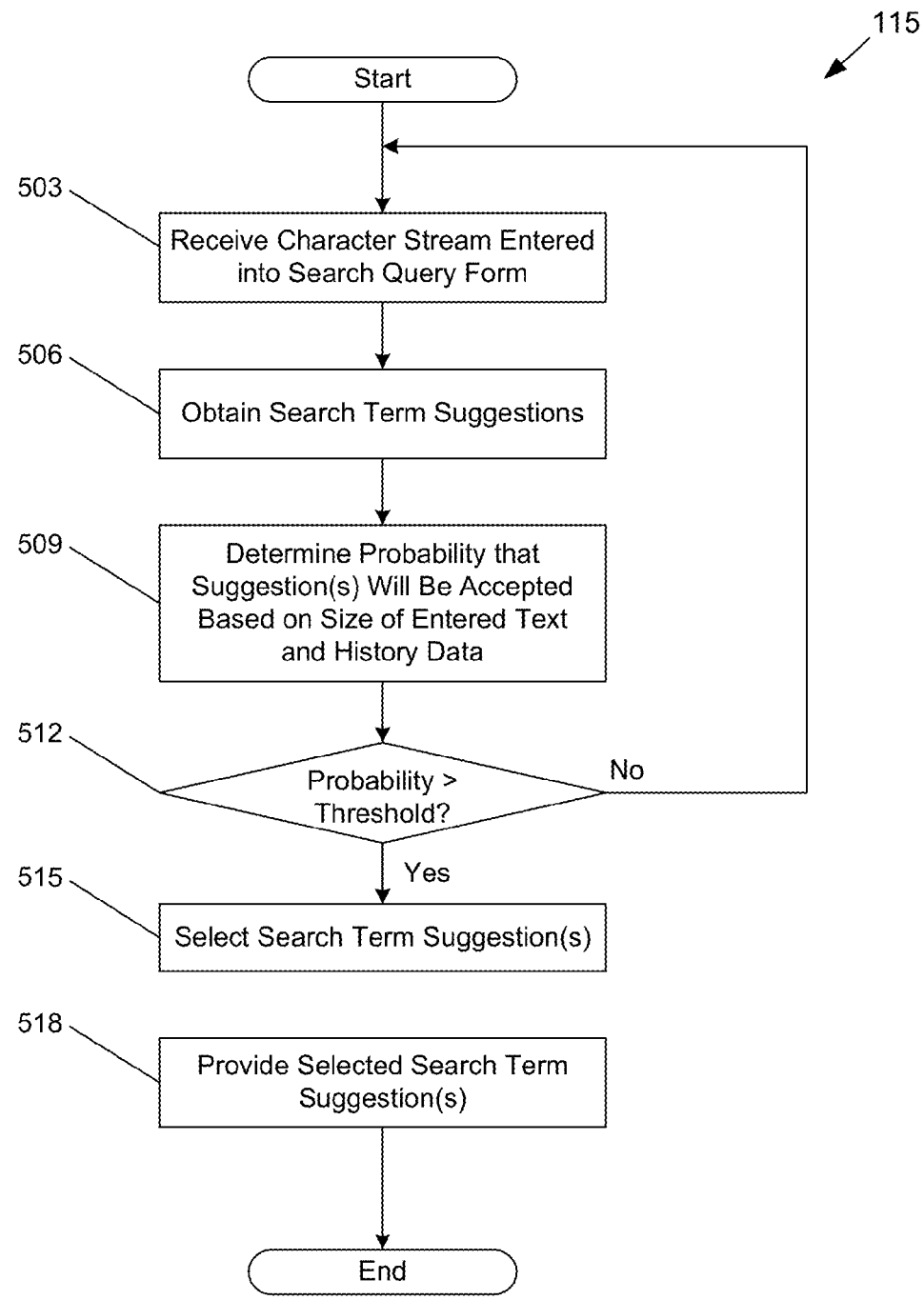
FIG. 5 is a flowchart illustrating an example of functionality implemented as portions of a network page generation application executed in a client computing device in the networked environment of FIG. 1 according to various embodiments of the present disclosure.

Moving on to FIG. 5, shown is a flowchart that provides one example of the operation of a portion of the network page generation application 115 (FIG. 1) according to various embodiments. It is understood that the flowchart of FIG. 5 provides merely an example of the many different types of functional arrangements that may be employed to implement the operation of the portion of the network page generation application 115 as described herein. As an alternative, the flowchart of FIG. 5 may be viewed as depicting an example of steps of a method implemented in the computing device 103 (FIG. 1) according to one or more embodiments.

In the embodiments described in connection with FIGS. 4A and 4B, the browser 151 receives periodic search term suggestions from the network page generation application 115 and decides when a user is likely to accept one of the search term suggestions, based on the number of characters entered by the user into a search query. In contrast, in the embodiment described in connection with FIG. 5 it is the network page generation application 115 that decides when a search term suggestion is likely to be accepted, based on the number of characters entered by the user into the search query. As described above in connection with FIG. 4, specific characters or key combinations (e.g., space, ctrl-v) may be treated as a confident prediction, and some characters or character sequences may be treated as confident predictors while others are not.

Beginning at box 503, the network page generation application 115 receives a stream of one or more characters from the browser 151, representing text entered by the user into a search query. At box 506, the network page generation application 115 obtains, from the search term suggestion engine 121, one or more suggested search terms. The suggestions are based on the text provided at box 503. Next, at box 509, the network page generation application 115 uses the size of the text entered by the user, along with search suggestion history data 136, to determine the probability that one of the suggestions will be accepted by the user.

At box 512, the network page generation application 115 compares the probability to a predefined threshold. If the probability is below the threshold, the network page generation application 115 continues to receive new characters in the text stream by repeating boxes 503 through 509 until the required probability can be obtained, or until the network page generation application 115 receives a search query executed by the user. If at box 512 it is determined that the probability is at or above the threshold, then processing continues at box 515.

At this point, any of the search term suggestions are good candidates for selection by the user for a search query, since the decision is based on how many characters the user has entered rather than the specific search terms. At box 515, the network page generation application 115 selects at least one search term from those suggested search terms obtained from the search term suggestion engine 121 at box 506. In some embodiments, the first search term suggestion is selected. In other embodiments, more than one search term suggestion may be selected. Next, at box 518, the network page generation application 115 provides the selected search term suggestions to the browser 151. The process of FIG. 5 is then complete.

Figure 6:
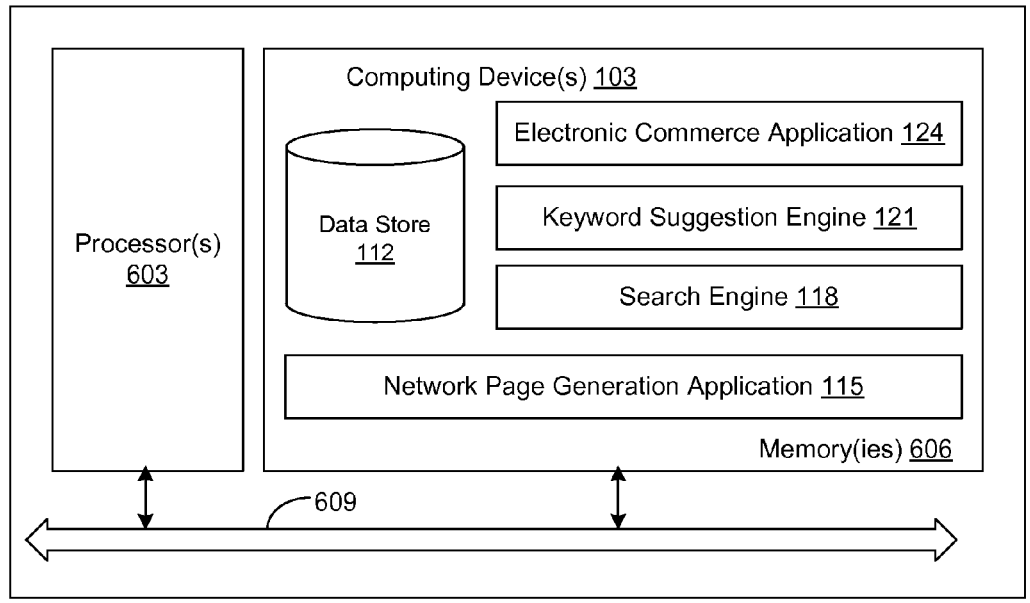
FIG. 6 is a schematic block diagram that provides one example illustration of a computing device employed in the networked environment of FIG. 1 according to various embodiments of the present disclosure.

Turning now to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the network page generation application 115, the search engine 118, the electronic commerce application 124, the search term suggestion engine 121, and potentially other applications. Also stored in the memory 606 may be a data store 112 and other data. In addition, an operating system may be stored in the memory 606 and executable by the processor 603.

Figure 7:
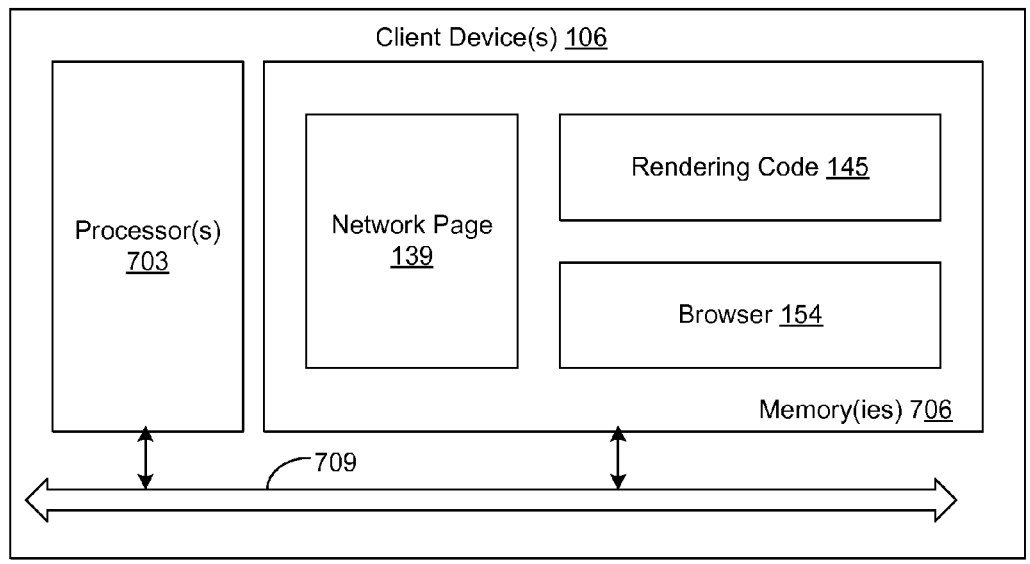
FIG. 7 is a schematic block diagram that provides one example illustration of a client device employed in the networked environment of FIG. 1 according to various embodiments of the present disclosure.

With reference now to FIG. 7, shown is a schematic block diagram of the computing device 103 according to an embodiment of the present disclosure. The computing device 103 includes at least one processor circuit, for example, having a processor 703 and a memory 706, both of which are coupled to a local interface 709. To this end, the computing device 103 may comprise, for example, at least one server computer or like device. The local interface 609 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the browser 151, the rendering code 145, and potentially other applications. In addition, an operating system may be stored in the memory 706 and executable by the processor 703.

It is understood that there may be other applications that are stored in the memory 606, 706 and are executable by the processor 603, 703, as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 606, 706 and are executable by the processor 603, 703. In this respect, the term "executable" means a program file that is in a form that can ultimately be run by the processor 603, 703. Examples of executable programs may be, for example, a compiled program that can be translated into machine code in a format that can be loaded into a random access portion of the memory 606, 706 and run by the processor 603, 703, source code that may be expressed in proper format such as object code that is capable of being loaded into a random access portion of the memory 606, 706 and executed by the processor 603, 703, or source code that may be interpreted by another executable program to generate instructions in a random access portion of the memory 606, 706 to be executed by the processor 603, 703, etc. An executable program may be stored in any portion or component of the memory 606, 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606, 706 is defined herein as including both volatile and nonvolatile memory and data storage components. Volatile components are those that do not retain data values upon loss of power. Nonvolatile components are those that retain data upon a loss of power. Thus, the memory 606, 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603, 703 may represent multiple processors and the memory 606, 706 may represent multiple memories that operate in parallel processing circuits, respectively. In such a case, the local interface 609, 709 may be an appropriate network 109 (FIG. 1) that facilitates communication between any two of the multiple processors 603, 703, between any processor 603, 703 and any of the memories 606, 706, or between any two of the memories 606, 706, etc. The local interface 609, 709 may comprise additional systems designed to coordinate this communication, including, for example, performing load balancing. The processor 603, 703 may be of electrical or of some other available construction.

Although the network page generation application 115, the search engine 118, the electronic commerce application 124, the search term suggestion engine 121, the browser 151, the rendering code 145, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete code circuits having code gates for implementing various code functions upon an application of one or more data signals, application specific integrated circuits having appropriate code gates, or other components, etc. Such technologies are generally well known by those skilled in the art and, consequently, are not described in detail herein.

The flowcharts of FIGS. 4-5 show the functionality and operation of an implementation of portions of the network page generation application 115 and the browser 151. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603, 703 in a computer system or other system. The machine code may be converted from the source code, etc. If embodied in hardware, each block may represent a circuit or a number of interconnected circuits to implement the specified logical function(s).

Although the flowcharts of FIGS. 4-5 show a specific order of execution, it is understood that the order of execution may differ from that which is depicted. For example, the order of execution of two or more blocks may be scrambled relative to the order shown. Also, two or more blocks shown in succession in flowcharts of FIGS. 4-5 may be executed concurrently or with partial concurrence. Further, in some embodiments, one or more of the blocks shown in FIGS. 4-5 may be skipped or omitted. In addition, any number of counters, state variables, warning semaphores, or messages might be added to the flow described herein, for purposes of enhanced utility, accounting, performance measurement, or providing troubleshooting aids, etc. It is understood that all such variations are within the scope of the present disclosure.

Also, any code or application described herein, including the network page generation application 115, the search engine 118, the electronic commerce application 124, the search term suggestion engine 121, the browser 151, and rendering code 145, that comprises software or code can be embodied in any non-transitory computer-readable medium for use by or in connection with an instruction execution system such as, for example, a processor 603, 703 in a computer system or other system. In this sense, the code may comprise, for example, statements including instructions and declarations that can be fetched from the computer-readable medium and executed by the instruction execution system. In the context of the present disclosure, a "computer-readable medium" can be any medium that can contain, store, or maintain the code or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
   capturing, via at least one of one or more computing devices, text as entered into a search query form;
   evaluating, via at least one of the one or more computing devices, whether at least one of a plurality of confidence criteria is met based at least in part on a comparison of a plurality of consecutive characters in the text with a plurality of character sequences associated with the at least one of the plurality of confidence criteria and a determination of whether a quantity of characters in the text exceeds a predefined percentage of a first search term suggestion, individual ones of the plurality of confidence criteria being associated with a respective confidence parameter that defines a measurement of confidence in an ability to accurately predict an intended search query, and the predefined percentage being based at least in part on a current search category of a search associated with the text; and
   in response to the at least one of the plurality of confidence criteria being met,
      providing, via at least one of the one or more computing devices, a speculative search query including a selected suggested search term to a server;
      storing, via at least one of the one or more computing devices, a plurality of speculative search results received from the server in response to the speculative search query; and
      in response to receiving an instruction to execute a committed search query that includes the selected suggested search term, causing, via at least one of the one or more computing devices, a browser window to be updated by rendering at least a portion of the plurality of speculative search results from a hidden portion of the browser window in a visible portion of the browser window, the hidden portion being separate from the visible portion.

2. The method of claim 1, wherein the plurality of speculative search results are not displayed in the browser window in response to receiving the plurality of speculative search results.

3. The method of claim 1, further comprising causing, via at least one of the one or more computing devices, the plurality of speculative search results to be rendered in the hidden portion of the browser window in response to receiving the plurality of speculative search results.

4. The method of claim 1, wherein evaluating whether the at least one of the plurality of confidence criteria is met is further based at least in part on at least one of whether a number of characters in the text exceeds a predefined threshold.

5. The method of claim 1, wherein evaluating whether the at least one of the plurality of confidence criteria is met further comprises comparing the text to a specific character defined by the plurality of confidence criteria and indicating that the plurality of confidence criteria are met when the specific character is present in the text.

6. The method of claim 1, further comprising:
   periodically providing, via at least one of the one or more computing devices, the text to the server; and
   in response to receiving a plurality of suggested search terms from the server upon providing the text to the server, selecting, via at least one of the one or more computing devices, a suggested search term from the plurality of suggested search terms to produce the selected suggested search term.

7. The method of claim 6, further comprising:
   causing, via at least one of the one or more computing devices, the selected suggested search term to be displayed.

8. The method of claim 7, further comprising providing, via at least one of the one or more computing devices, the speculative search query to the server prior to receiving the instruction to execute the search query including the selected suggested search term.

9. The method of claim 8, further comprising causing, via at least one of the one or more computing devices, a remaining portion of the plurality of speculative search results from the speculative search query to be rendered in the visible portion of the browser window in response to receiving the remaining portion of the plurality of speculative search results from the speculative search query.

10. The method of claim 1, wherein the plurality of confidence criteria are based at least in part on user behavior data associated with a specific user account.

11. A system, comprising:
   at least one computing device comprising a processor and a memory; and
   at least one application executable in the at least one computing device, wherein, when executed, the at least one application causes the at least one computing device to at least:
      monitor a text entry to capture a plurality of characters entered by a user into a search query form;
      evaluate whether at least one confidence criterion is met by at least comparing at least two consecutive characters of the plurality of characters with a plurality of character sequences associated with the at least one confidence criterion and determining whether a quantity of characters in the text exceeds a predefined percentage of a first search term suggestion, the at least one confidence criterion being associated with a confidence parameter that defines a measurement of confidence in an ability to accurately predict an intended search query, and the predefined percentage being based at least in part on a current search category of a search associated with the text entry;
      provide a speculative search query, including a selected suggested search term, to a server, in response to an indication that the at least one confidence criterion is met;
      render a plurality of speculative search results received from the server in a hidden portion of a browser window, wherein the browser window comprises the hidden portion and a visible portion, the visible portion being separate from the hidden portion; and update the browser window by rendering at least a portion of the plurality of speculative search results from the hidden portion of the browser window in the visible portion of the browser window, in response to receiving an instruction to execute a committed search query that includes the selected suggested search term.

12. The system of claim 11, wherein evaluating whether the at least one confidence criterion is met further comprises determining whether a number of characters in the text entry exceeds a predefined threshold.

13. The system of claim 11, wherein evaluating whether the at least one confidence criterion is met further comprises:
   comparing the text entry to a specific character defined by the at least one confidence criterion; and
   indicating that the at least one confidence criterion is met when the specific character is present in the text entry.

14. The system of claim 11, wherein, when executed, the at least one application further causes the at least one computing device to at least:
   display the selected suggested search term to the user.

15. The system of claim 11, wherein, when executed, the at least one application further causes the at least one computing device to at least:
   provide the speculative search query before receiving the instruction to execute the committed search query including the selected suggested search term.

16. The system of claim 11, wherein, when executed, the at least one application further causes the at least one computing device to at least:
   request a remaining portion of the plurality of speculative search results; and
   render the remaining portion of the plurality of speculative search results from the speculative search query in the visible portion of the browser window in response to receiving the remaining portion of the plurality of speculative search results from the speculative search query.

17. The system of claim 11, wherein evaluating whether the at least one confidence criterion is met further comprises evaluating a size of the text entry.

18. A non-transitory computer-readable medium embodying a program executable in a computing device, wherein, when executed, the program causes the computing device to at least:
   capture a text entry;
   periodically provide the text entry to a server;
   determine that at least one of a plurality of confidence criteria is met by comparing at least two consecutive characters in the text entry with a plurality of character sequences associated with the at least one of the plurality of confidence criteria and determining that a quantity of characters in the text entry exceeds a predefined percentage of a first search term suggestion, individual ones of the plurality of confidence criteria being associated with a respective confidence parameter that defines a measurement of confidence in an ability to accurately predict an intended search query, and the predefined percentage being based at least in part on a current search category of a search associated with the text entry;
   identify a selected suggested search term selected from a plurality of suggested search terms that are received from the server in response to providing the text entry;
   provide a speculative search query, including the selected suggested search term, to the server, in response to an indication that the at least one of the plurality of confidence criteria is met;
   store a plurality of speculative search results in response to receiving the plurality of speculative search results based at least in part on the speculative search query;
   render the plurality of speculative search results in a hidden portion of a user interface before receiving an instruction to execute a committed search query that includes the selected suggested search term, the user interface comprising the hidden portion and a visible portion, the visible portion being separate from the hidden portion; and
   update the user interface by rendering at least a portion of the plurality of speculative search results from the hidden portion of the user interface in the visible portion of the user interface, in response to receiving the instruction to execute the committed search query that includes the selected suggested search term.

19. The non-transitory computer-readable medium of claim 18, wherein determining that the at least one of the plurality of confidence criteria is met further comprises:
   comparing the text entry to a specific character defined by the plurality of confidence criteria; and
   indicating that the at least one of the plurality of confidence criteria is met when the specific character is present in the text entry.

20. The non-transitory computer-readable medium of claim 18, wherein at least one of the plurality of confidence criteria is based at least in part on user behavior data.

* * * * *